(12) United States Patent
Searles et al.

(10) Patent No.: US 11,387,733 B2
(45) Date of Patent: Jul. 12, 2022

(54) RAPID DISCHARGE OF POWER NODES

(71) Applicant: Apple Inc., Cupertino, CA (US)

(72) Inventors: Shawn Searles, Austin, TX (US); Fabio Gozzini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,764

(22) Filed: Sep. 24, 2020

(65) Prior Publication Data

US 2022/0094267 A1     Mar. 24, 2022

(51) Int. Cl.
*H02M 1/36* (2007.01)
*H02M 3/158* (2006.01)
*H02M 1/32* (2007.01)

(52) U.S. Cl.
CPC ............. *H02M 3/158* (2013.01); *H02M 1/32* (2013.01); *H02M 1/36* (2013.01)

(58) Field of Classification Search
CPC .......................................... H02M 3/155–1588
See application file for complete search history.

(56) References Cited

U.S. PATENT DOCUMENTS

| | | |
|---|---|---|
| 6,184,660 B1 | 2/2001 | Hatular |
| 9,316,695 B2 | 4/2016 | Takahashi et al. |
| 10,148,178 B2 | 12/2018 | Oh et al. |
| 10,211,744 B2 | 2/2019 | Bianco et al. |
| 2004/0124818 A1* | 7/2004 | Dequina ............... H02M 3/156 323/282 |
| 2008/0211465 A1* | 9/2008 | Kung .................... H02M 3/156 323/222 |
| 2010/0231188 A1* | 9/2010 | Latham, II .......... H02M 3/1588 323/282 |
| 2014/0210447 A1* | 7/2014 | Rutkowski ................ G05F 3/02 323/311 |
| 2018/0375320 A1* | 12/2018 | Ho ......................... H02M 3/156 |
| 2019/0265278 A1* | 8/2019 | Wei ...................... H03F 3/45475 |

FOREIGN PATENT DOCUMENTS

WO        2008152548        12/2008

* cited by examiner

*Primary Examiner* — Peter M Novak
(74) *Attorney, Agent, or Firm* — Kowert, Hood, Munyon, Rankin & Goetzel, P.C.; Erik A. Heter; Dean M. Munyon

(57) ABSTRACT

A method and apparatus for rapid discharge of power rails is disclosed. A circuit includes a power converter circuit includes an inductor coupled between a switch node and regulated power supply node. A first device is coupled between an input power supply node and the switch node, while a second device is coupled between the switch node and a ground node. The power converter is configured to generate a particular voltage level on the regulated power supply node by controlling the first and second devices. The circuit also includes a control circuit which, in response to receiving a discharge comment, repeatedly activates and deactivates the second device to discharge, via the switch node and the inductor, the regulated power supply node.

20 Claims, 6 Drawing Sheets

RAPID DISCHARGE OF POWER NODES

BACKGROUND

Technical Field

This disclosure is directed to electronic circuits, and more particularly, to DC-DC converters.

Description of the Related Art

Voltage regulators are commonly used in a wide variety of electronic systems in order to provide a desired voltage to particular circuits. To this end, a wide variety of voltage regulator circuits are available to suit various applications. Linear voltage regulators are used in a number of different applications in which the available supply voltages exceed an appropriate value for the circuitry to be powered. Another type of voltage regulator is a switched-mode voltage regulator, more commonly referred to a switching power supply, or alternatively, a DC-DC converter. Switching power supplies can be subdivided into two categories, buck converters and boost converters. A buck converter, from its supply to its load, steps down an input voltage, while stepping up current. A boost converter, from its supply to its load, steps up the input voltage while stepping down the current.

A basic switching power supply includes a switch and an energy storage element (such as an inductor). Operation in a basic switching power supply includes an on state (e.g., when the switch is in a first position) and an off state (e.g., when the switch is in a second position). During the on state, the energy storage element begins to store energy. For example, when the energy storage element is an inductor, current increases and responsive thereto, the inductor produces an opposing voltage across its terminals. During the off state, the switch is open and the inductor becomes a current source. Over time, the changing voltage of the switching power supply is averaged out to a substantially DC voltage.

SUMMARY

A method and apparatus for rapid discharge of power rails is disclosed. In one embodiment, a circuit includes a power converter circuit includes an inductor coupled between a switch node and regulated power supply node. A first device is coupled between an input power supply node and the switch node, while a second device is coupled between the switch node and a ground node. The power converter is configured to generate a particular voltage level on the regulated power supply node by controlling the first and second devices. The circuit also includes a control circuit which, in response to receiving a discharge comment, repeatedly activates and deactivates the second device to discharge, via the switch node and the inductor, the regulated power supply node.

In one embodiment, the power converter may operate within a range of voltages between a minimum and a maximum voltage. Within this band, the voltage may be changed by changing the respective duty cycles of the first and second devices. In response to the discharge command, the power converter may initially reduce the voltage on the regulated power supply node to the minimum voltage. Thereafter, repeated activation and deactivation of the second device may begin (while the first device may be held inactive). The second device may, in one embodiment, be activated and deactivated in pulses, wherein each pulse has a first fixed duration and the inactive period between pulses may have a second fixed duration (which may be different from the first duration). In another embodiment, a current passing through the switch node may be monitored. The second device may remain active until the current reaches a threshold value. Thereafter, the second device is inactivated for a specified duration. In various embodiments, discharging of the regulated power supply node may continue until the voltage thereon has fallen to a value less than or equal to a target voltage value.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a method and apparatus for discharging power rails in a switching power supply circuit (e.g., a buck regulator). In various electronic systems, such as certain battery powered portable systems, it is desirable for power savings to power down circuits that are not currently in use. This may in turn result in the discharging of supply voltage nodes coupled to the circuits to be powered down. This may be accomplished by a circuit including a transistor and a resistor coupled between, e.g., a switching node and ground. However, powering down in this manner may consume a significant amount of time.

In the present disclosure, various portions of a switching regulator may be used to either assist with the discharge of a supply voltage node, or perform the entirety of the operation. For example, in a buck converter, the present disclosure utilizes a low-side transistor coupled to a switching node as a discharge path. Operation of the low side switch may be conducted under the control of a discharge control circuit, which may alternatively activate and deactivate the low side transistor to discharge the switching node, and thus the supply voltage node. This may allow a controlled discharge of the corresponding supply voltage node, which may be performed in significantly less time than if performed using the conventional method using a discharge circuit having a transistor and resistor. Various embodiments of a switching power converter circuit and method for discharging its corresponding supply voltage node are now discussed in further detail below.

Figure 1:
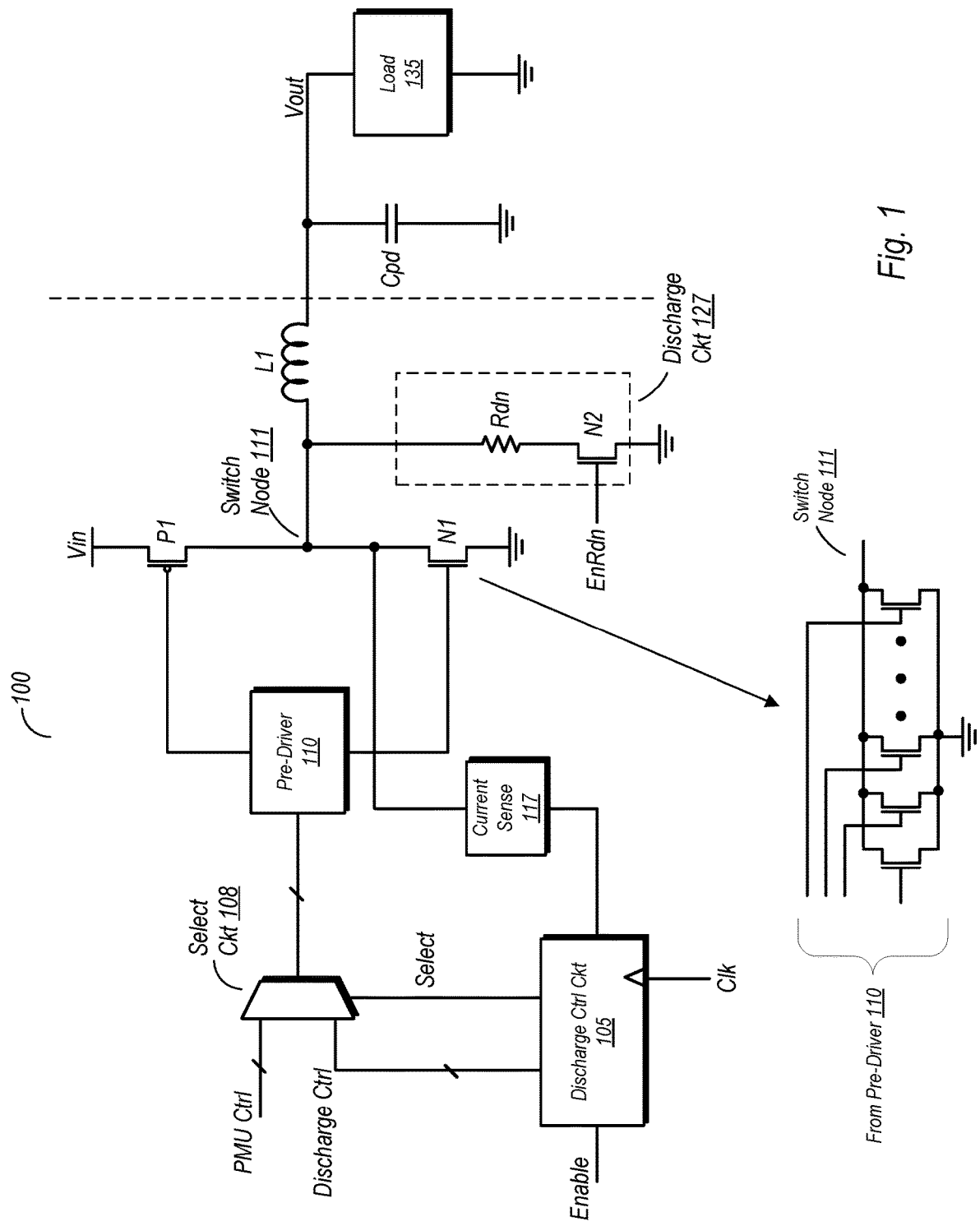
FIG. 1 is a schematic diagram of one embodiment of a circuit including a power converter circuit and a discharge control circuit.

FIG. 1 is a schematic diagram of one embodiment of a circuit including a power converter circuit and a discharge control circuit. In the embodiment shown, power converter circuit 100 is a DC-DC converter, and more particularly, a z converter that receives an input voltage, Vin, and provides an output voltage on the regulated supply voltage node, Vout, that is less than the input voltage. The voltage provided on Vout is regulated in that power converter 100 operates to maintain this voltage at a specified value (although this specified value may vary during operation).

Power converter 100 includes a first switching device P1 coupled between switch node 111 and the input voltage node Vin. The first switching device may be referred to as the high side switch. A second switching device N1 is coupled between switching node 111 and a ground node. First switching device P1 in this embodiments is a PMOS transistor, while second switching device N1 is an NMOS device.

It is noted, as indicated in the drawing, that N1 may in some embodiments be implemented using a number of transistors coupled in parallel but are independently controllable with respect to one another. The high side switch implemented by P1 may be implemented in the same manner.

Respective drain terminals of P1 and N1 are coupled to switching node 111. An inductor L1 includes a first terminal coupled to switching node 111, and a second terminal coupled to the regulated supply voltage node Vout. A load circuit 135 is coupled to receive the regulated supply voltage via Vout. The load circuit may be virtually any type of circuitry, analog, digital, or mixed signal, that may operate based on a regulated supply voltage. A capacitor Cpd is also coupled in parallel with load circuit 135. In some embodiments, power converter circuit 100 is implemented on an integrated circuit along with load circuit 135. In other embodiments, power converter circuit and load circuit may be implemented on separate integrated circuit dies, and more generally, separately from on another. Capacitor Cpd may be an on-chip or off-chip capacitor, as desired for the particular embodiment.

Respective gate terminals of P1 and N1 are coupled to pre-driver circuit 110, which may alternatively activate and de-activate both of these devices, one at a time, to control the level of the output voltage. When P1 is active, switch node 111 is effectively coupled to the input voltage node Vin, and inductor L1 is charged, thereby transferring energy to the output voltage node Vout. When N1 is active, switch node 111 is effectively coupled to ground, thereby discharging switch node 111 and inductor L1. Pre-driver circuit 110 may control the level of the voltage on regulated supply voltage node Vout by controlling the respective duty cycles of P1 and N1. To increase the voltage conveyed on Vout, pre-driver circuit 110 may increase the duty cycle of P1 while correspondingly reducing the duty cycle of N1. Conversely, to reduce the voltage on Vout, pre-driver circuit 110 may cause a reduction of the duty cycle of P1 while increasing the duty cycle of N1. Since L1 is an energy storage device, alternately storing and releasing energy, the changes to the voltage on switch node 111 may be largely averaged out on Vout, thereby causing a substantially DC voltage to be provided to load circuit 135. This averaging may be assisted by the presence of capacitor Cpd.

Although not explicitly shown, the regulated supply voltage node Vout, or a voltage derived therefrom, may be fed back to other circuitry for comparison to a reference voltage. The reference voltage may be set in accordance with the desired voltage level on Vout. In one embodiment, circuitry located in a power management unit (omitted here for simplicity) may compare the voltage level on Vout (or voltage derived therefrom) to the reference voltage and, responsive to the comparison, generate control signals to pre-driver circuit 110 to adjust the voltage level accordingly.

An optional discharge circuit 127 is included in the embodiment shown. Discharge circuit 127 as shown here includes a resistor Rdn and an NMOS transistor N2. A gate terminal of N2 may be coupled to receive an enable signal, EnRdn, which serves as a discharge command. When this enable signal is asserted, transistor N2 may be used to di between switch node 111 and ground, through resistor Rdn. Accordingly, a power management unit (not shown) or other circuit may assert the enable signal during, e.g., a power down of load circuit 135 in order to discharge both switch node 111 and Vout. However, as noted above, discharging in this manner can be slow and prevent switch node 111 and regulated supply voltage node Vout from discharging in a satisfactory amount of time. Accordingly, a discharge control circuit 105 is coupled to power converter 100 and is configured to control the discharging of switch node 111, and thus Vout, through transistor N1.

As noted above, N1 may be implemented as a number of individual, independently controllable transistors coupled to in parallel between switch node 111 and ground. Accordingly, as part of the discharge process, controlling the amount of discharge current between switch node 111 and ground may include activating only a subset of the parallel-coupled transistor rather than activating the full set. The number of transistors activated during any given pulse during the discharge process may further vary from one pulse to the next. Furthermore, if it is desirably to prevent inrush currents, transistors in this embodiment may be activated in a sequence until all of a desired subset (or full set) are active. More generally, having a number of independently controllable transistors coupled in parallel for implementing the low side switch may provide an extra degree of control, both during normal operation as well as during the discharge process.

During the discharge process, transistor N1 may be activated for a period of pulses each having a specified duration. With regard to the discharge operation, a pulse may be defined herein as a time during which transistor N1 is active and thus provides a current path between switch node 111 and ground. Thus, during each pulse, energy stored in inductor L1 may be discharged to ground through switch node 111. The pulses may be of equal duration in some embodiments, or of a variable duration in other embodiments.

Controlling the activation of transistor N1 during the discharge process may be vary from one embodiment to another. In one embodiment, transistor N1 may be activated for a number of pulses of equal duration. Similarly, the amount of time between pulses may also be of an equal duration, although this duration is not necessarily the same as the duration of a pulse The number of pulses may be pre-determined in some embodiments, based on a determination on a maximum amount of time needed to the regulated supply voltage node Vout to a voltage level less than or equal to a target voltage. In another embodiment, feedback provided from, e.g., the regulated supply voltage node Vout may be monitored, and pulses may continue to be provided until the voltage on Vout has been detected to be less than or equal to the target voltage.

In another embodiment, the duration of a pulse may be dependent on an amount of current discharged through switch node 111 to ground. As shown in FIG. 1, an optional current sense circuit 117 is coupled to monitor the amount of current through switch node 111. Transistor N1 may be held active until the amount of current sensed by current sense circuit 117 meets or exceeds a threshold value. Thereafter, transistor N1 may be inactive for a time before the next variable-duration pulse of activation. Since the amount of energy stored in inductor L1 is declining during the discharge processes, the amount of current discharged through switch node 111 may also vary. Accordingly, since the duration of each pulse in this embodiment is dependent on the amount of current discharged through switch node 111, the duration of the pulses may vary.

Control of the discharge process in the embodiment shown is conducted by discharge control circuit 105. As shown here, discharge control circuit is coupled to a selection circuit 108 (e.g., a multiplexer) that is further coupled to provide control signals to pre-driver circuit 110. During normal (e.g., non-discharge) operation when power is being provided to load circuit 135, a select signal ('Select') provided by discharge control circuit 105 to select circuit 108 is set to select control signals from a power management unit ('PMU Ctrl'). In various embodiments, any suitable source may provide these control signals, which may indicate a desired output voltage, desired duty cycle of transistors P1 and P2, and so on.

Responsive to receiving a discharge command in the form of an enable signal ('Enable') from a power management unit or other suitable source, discharge control circuit 105 may set the selection signal to select the discharge control signals ('Discharge Ctrl'). These signals are then conveyed to pre-driver circuit 110 to control the discharge process.

During normal operation, the voltage provided on the regulated supply voltage node Vout may vary within a particular range of voltages, referred to herein as an operating band. The particular voltage provided by power converter 100 may depend on the respective duty cycles of P1 and N1. Longer duty cycles of P1 with corresponding shorter duty cycles of N1 may generally correspond to higher voltages on Vout. Shorter duty cycles of P1 with corresponding longer duty cycles for N2 may generally correspond to lower voltages on Vout. During the discharge process, discharge control circuit 105 may initially cause a reduction of the voltage on Vout to the lower portion of the band by causing pre-driver circuit 110 to increase the duty cycle of N1 and decrease the duty cycle of P1. Upon the voltage on Vout reaching the lower end of the operating band, discharge control circuit 105 may cause pre-driver circuit 110 to discontinue activations of P1, while activating N1 in the pulses described above. This may continue until the voltage on Vout out falls to or below the target voltage, after which it can be considered effectively discharged and load circuit 135 effectively powered down.

Figure 2:
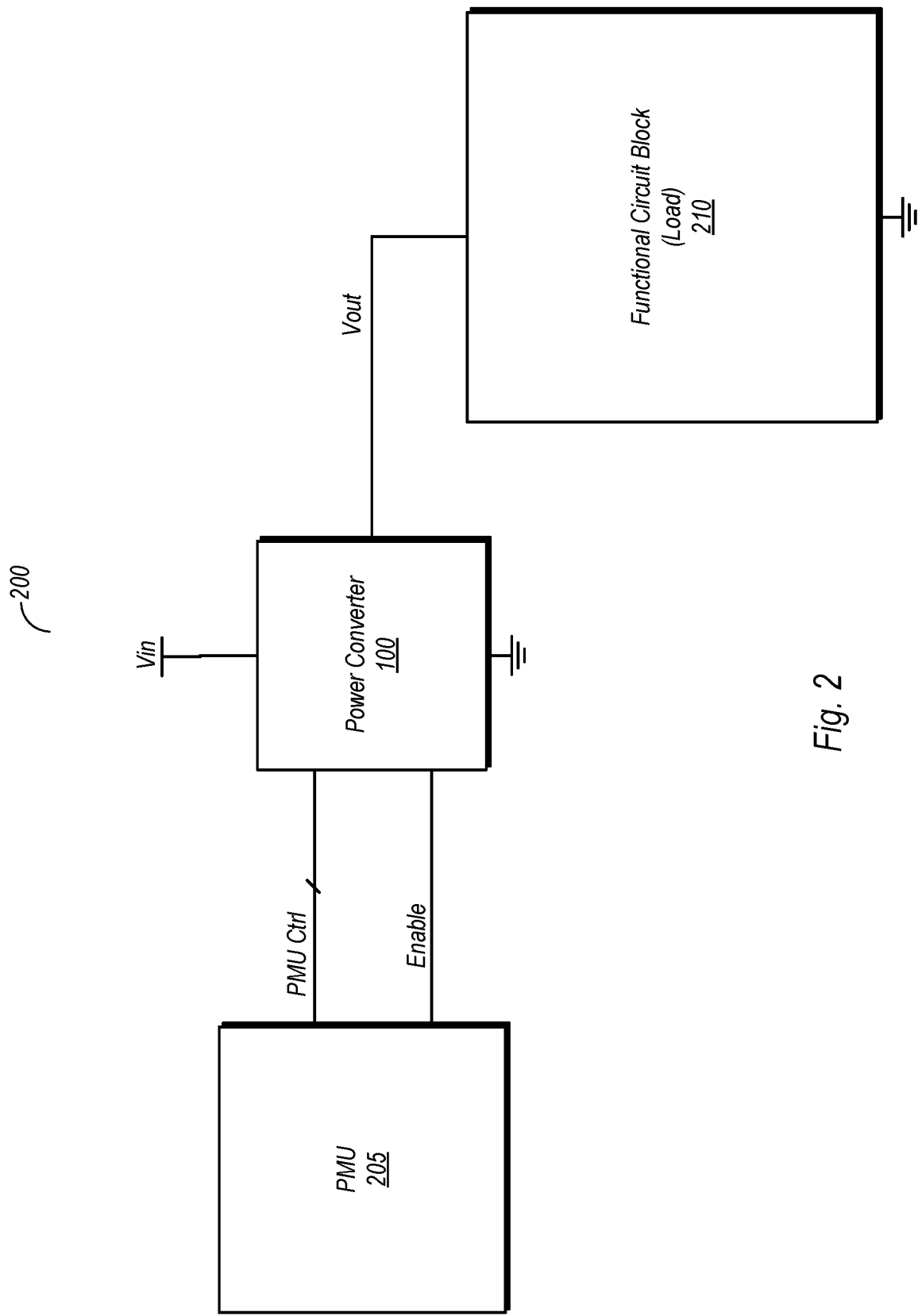
FIG. 2 is a block diagram of a system including a power converter circuit.

FIG. 2 is a block diagram of a system including a power converter circuit. In the embodiment shown, system 200 includes a power management unit 205, an embodiment of power converter 100, and functional circuit lock 210. Functional circuit block 210 in the embodiment shown is a load to power converter 100, and may include analog, digital, and/or mixed signal circuitry. System 200 may be implemented on a single integrated circuit die in some embodiments, or across multiple integrated circuits in other embodiments.

Power management unit 205 in the embodiment shown includes circuitry that performs a number of different power management functions, including controlling performance states of various functional circuit blocks including functional circuit block 210. Controlling a performance state may include controlling an operating voltage at which a functional circuit block operates, and may also controlling the frequency of one or more clock signals provided thereto. In this particular embodiment, control of the voltage provided by power converter 100 may be accomplished through the PMU control signals conveyed from power management unit 205 to power converter 100, in accordance with the discussion above regarding FIG. 1.

Power management unit 205 may also include circuitry configured to cause the powering down or powering up of various functional circuit blocks within the system. This may include powering down or powering up a corresponding power supply, such as power converter 100. Accordingly, in the embodiment shown, power management unit 205 may cause functional circuit block 210 to be powered down by asserting the enable signal provided to power converter 100. Responsive to receiving the asserted enable signal, power converter 100 may begin the discharge process discussed above and in further detail below.

Figure 3:
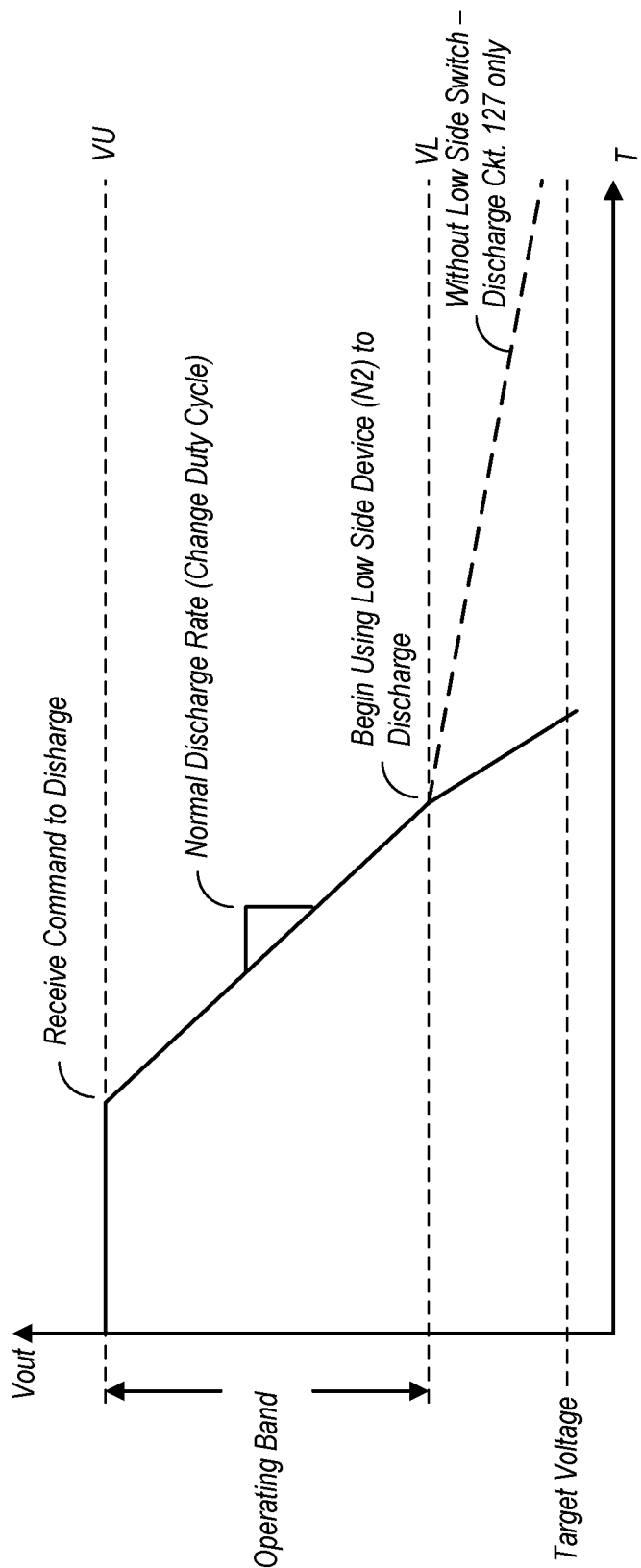
FIG. 3 is a graphic illustration of one embodiment of a discharge procedure for a regulated voltage supply node.

FIG. 3 is a graphic illustration of one embodiment of a discharge procedure for a regulated voltage supply node. The discharge example shown may be carried out by various embodiments of a power converter 100 as discussed above.

As previously noted, various embodiments of a power converter 100 provide the regulated supply voltage, Vout, in a specified operating band, which is illustrated on the vertical axis. In this particular example, the supply voltage is being provided at the upper end of the operating band, VU, until the discharge command (e.g., the Enable signal) is receive. Upon receiving the discharge command, the power converter may discharge the switch node (and thus the Vout node) at a normal discharge rate. This may be accomplished by changing the respective duty cycles of the high side (e.g., P1 of FIG. 1) and low side (e.g., N1 of FIG. 1) switching devices. This may involve increasing the duty cycle of the low side switching device and correspondingly decreasing the duty cycle of the high side switching device.

Upon the voltage on Vout falling to the minimum voltage of the operating band, VL, the operation of power converter changes. In particular, operation of the high side switch is discontinued, with discharging conducted through the low side switch. In particular, the discharge pulses are initiated by alternately switching the low side switch on and off. While the low side switch is on, a current path between the switching node and ground is provided, and thus switch node 111 discharges. As noted above, the duration of the pulses may be fixed or variable depending on the embodiment. In the former, pulses have a specified duration, followed by a specified time off. In the latter, the duration of the pulses may depend on, e.g. an amount current flowing through the switch node, as sensed by a current sense circuit 117, and thus the duration of the pulses may vary. The discharge operation may continue until the voltage on Vout has fallen to at least the target voltage. Thereafter, the discharge operation may be considered complete, and the regulated supply voltage node, Vout (and thus any loads configured to operated on this voltage) to be powered down. The low side switch may then be placed in a desired stated until normal operation resumes. (e.g., power converter 100 powered on and providing power to the load).

Figure 4:
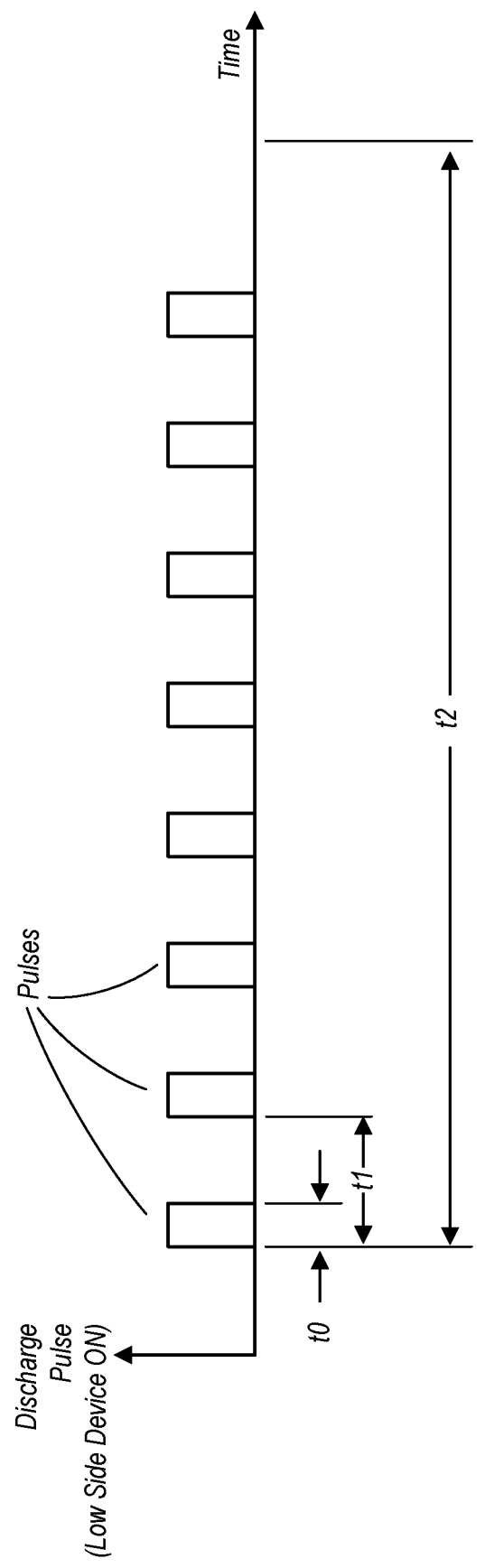
FIG. 4 is a timing diagram illustrating one embodiment of a discharge procedure for a regulated voltage supply node.

FIG. 4 is a timing diagram illustrating one embodiment of a discharge procedure for a regulated voltage supply node. More particularly, FIG. 4 illustrates one embodiment in which pulses of equal duration are provided to discharge a regulated supply voltage node. In the example shown, discharge process begins assertion of pulses at or after the voltage on the regulated supply voltage node of the power converter has been reduced at least to a minimum voltage of an operating voltage band, such as that shown in FIG. 3. The pulses comprise the activation of the low side switch that comprises one or more transistors. Each of the pulses in this example has a fixed duration of time t0, which is representative of the amount of time a discharge path is active between the switch node and the ground node due to the activation of the low side switch. The full period of a single cycle is time t1, which spans the duration from the beginning of one pulse to the beginning of the next pulse. Thus, the duration between pulses is also fixed in this particular example. Pulses may continue to be asserted over a time t2, which provides a sufficient amount of time to discharge the regulate supply voltage node down to a target voltage or lower.

It is noted that the number of pulses shown here is merely an example, and is not intended to be limiting. With respect to the time t2, this duration may vary in some embodiments, or may be fixed in other embodiments. In the case where t2 is a fixed value, it may be set based on a time that is determined to be able to discharge the regulated supply voltage node down to the desired level.

It is further noted that, in other embodiments, the duration of given pulses may be variable. For example, as discussed above, some embodiments may utilize current sensing, and the pulse duration may depend on an amount of current flowing through the switch node (with the pulse ending when the current meets a threshold value). The duration between pulses in such embodiments may be fixed or may be variable as well.

Finally, as the low side switch may comprise a number of independently controllable transistors coupled in parallel between the switch node and ground, it is thus note that the activation time for at least some of these devices may be less than the full duration of a given pulse in at least embodiments. Thus, the pulse duration may represent the full amount of time a current path is active between the switch node and ground, even though the number of transistors providing the current path may vary over the duration of the pulse.

Figure 5:
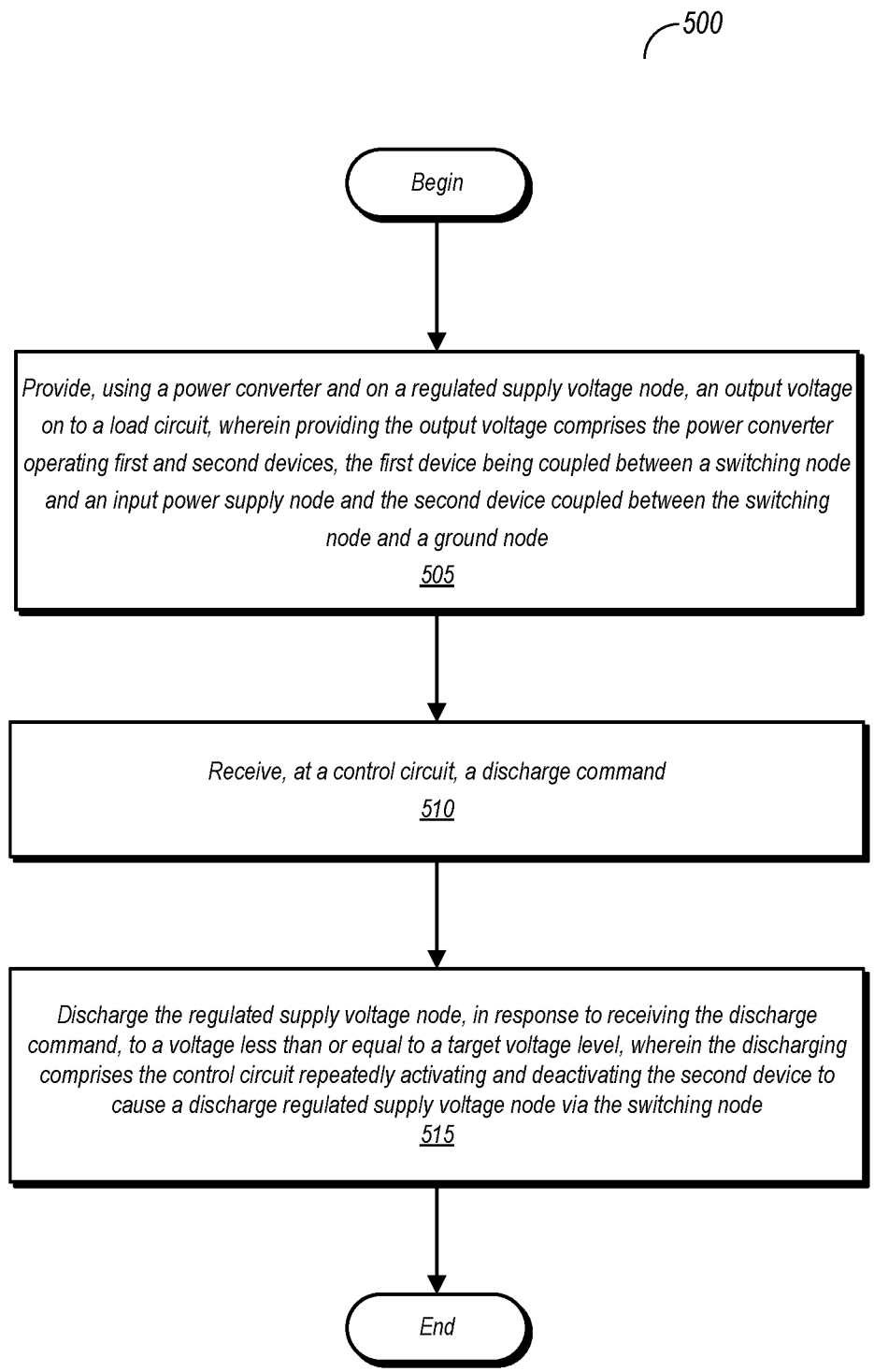
FIG. 5 is a flow diagram illustrating one embodiment of a method for discharging a regulated voltage supply node.

FIG. 5 is a flow diagram illustrating one embodiment of a method for discharging a regulated voltage supply node. Method 500 as shown in FIG. 5 and discussed below may be performed with various embodiments of a power converter discussed above. Furthermore, power converters not explicitly disclosed herein, but capable of carrying out Method 500, may be considered to fall within the scope of this disclosure.

Method 500 includes providing, using a power converter and on a regulated supply voltage node, an output voltage on to a load circuit, wherein providing the output voltage comprises the power converter operating first and second devices, the first device being coupled between a switching node and an input power supply node and the second device coupled between the switching node and a ground node (block 505). The method further includes receiving, at a control circuit, a discharge command (block 510). The discharge command may be, in one embodiment, an enable signal that enables a discharge control circuit, such as that discussed above in reference to FIG. 1. Thereafter, the method includes discharging the regulated supply voltage node, in response to receiving the discharge command, to a voltage less than or equal to a target voltage level, wherein the discharging comprises the control circuit repeatedly activating and deactivating the second device to cause a discharge regulated supply voltage node via the switching node (block 515).

In in some embodiments, discharging includes activating the second device for a first specified duration, deactivating the second device for a second specified duration, and repeating the activating and deactivating until a voltage on the regulated supply voltage node has fallen to the voltage less than or equal to the target voltage level. The first and second specified durations are not necessarily equal in all embodiments, but may be equal in some. The pulsed operation of repeating activating and deactivating may continue for a third duration that is sufficient to discharge the regulated supply voltage node to desired level.

Embodiments are also possible and contemplated in which the discharging comprises activating the second device and subsequently deactivating the second device in response to a current through the switching node exceeding a current threshold value. This deactivation may also include the second device inactive for a fixed duration. The method may further include repeating the activating and deactivating until a voltage on the regulated supply voltage node has fallen to the voltage less than or equal to the target voltage level.

In various embodiments, operating the power converter includes providing the output voltage within a specified range of voltages between a minimum specified voltage and a maximum specified voltage. In response to the control circuit receiving the discharge command, the method includes reducing the output voltage to the minimum specified voltage. Reducing the output voltage to the minimum specified voltage comprises changing respective duty cycles of the first and second devices. Thereafter, the method includes beginning the discharging of the regulated supply voltage node in response to the output voltage reaching the minimum specified voltage.

Figure 6:
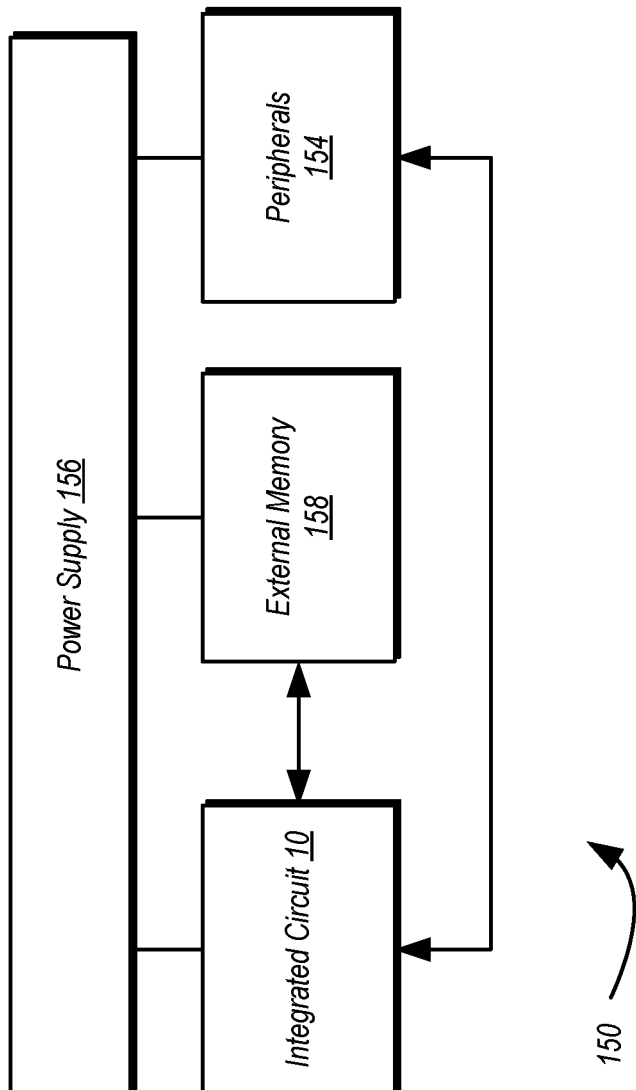
FIG. 6 is a block diagram of one embodiment of an example system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

IC 10 in the embodiment shown here may include one or more instances of a power converter such as one of the various embodiments discussed above, with the power converter being configured to discharge a corresponding regulated supply voltage node as disclosed herein. Various ones of peripherals 154 may also include one or more integrated circuits upon which an embodiment of a power converter 100 is implemented. In the various instances of the power converter 100 implemented in system 150, a discharge process such as the one discussed above may be conducted.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity, described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing; the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A circuit comprising:
    a power converter circuit including a switch node coupled to a regulated power supply node via an inductor, a first device coupled between an input power supply node and the switch node, and a second device coupled between the switch node and a ground node, wherein the power converter circuit is configured to generate a particular voltage level on the regulated power supply node, the particular voltage level being within a range between a first voltage and a second voltage that is less than the first voltage; and
    a control circuit configured to, in response to receiving a discharge command:
        reduce the particular voltage level to the second voltage by changing respective duty cycles of the first and second devices; and
        begin, in response to the particular voltage level reaching the second voltage, repeatedly activating and deactivating the second device to discharge the regulated power supply node from the second voltage to a target voltage;
        wherein control circuit is configured to cause the first device to remain inactive during the repeatedly activating and deactivating the second device.

2. The circuit of claim 1, wherein the control circuit is further configured to cause the regulated power supply node to be discharged to a voltage level that is less than or equal to a target voltage by activating and deactivating the second device.

3. The circuit of claim 1, wherein, in repeatedly activating and deactivating the second device to discharge the regulated power supply node, the control circuit is configured to cause the second device to be active for ones of a plurality of pulses having a first specified duration followed by being inactive for a second specified duration prior to a next one of the plurality of pulses.

4. The circuit of claim 1, wherein, in repeatedly activating and deactivating the second device to discharge the regulated power supply node, the control circuit is configured to cause activation of the second device and subsequently cause deactivation of the second device in response to a current through the switch node reaching a threshold vale, wherein the control circuit is further configured to hold the second device inactive for a specified time prior to re-activating.

5. The circuit of claim 4, further comprising a current sensing circuit configured to determine an amount of current through the switch node and further configured to provide an indication to the control circuit in response to the current through the switch node reaching a threshold current value.

6. The circuit of claim 1, further comprising a plurality of second devices coupled between the switch node and the ground node, the plurality of devices including the second device.

7. The circuit of claim 6, wherein the control circuit is further configured to control a rate of discharge by activating selected ones of the plurality of second devices to discharge the regulated power supply node.

8. The circuit of claim 1, further comprising a pre-driver circuit coupled to control the first and second devices, wherein the control circuit is configured to control the pre-driver circuit in response to receiving the discharge command.

9. The circuit of claim 1, further comprising a selection circuit, wherein the control circuit is configured to select one of the discharge command or a control signal from a power management unit to be provided to a pre-driver of the power converter circuit.

10. A method comprising:
    providing, using a power converter and on a regulated supply voltage node, an output voltage on to a load circuit, wherein providing the output voltage comprises the power converter operating first and second devices, the first device being coupled between a switching node and an input power supply node and the second device coupled between the switching node and a ground node, and further comprises providing the output voltage within a specified range of voltages between a minimum specified voltage and a maximum specified voltage;
    receiving, at a control circuit, a discharge command;
    discharging the regulated supply voltage node, in response to receiving the discharge command, to a voltage less than or equal to a target voltage level, wherein the discharging comprises:
        reducing the output voltage to the minimum specified voltage in response to the control circuit receiving the discharge command, wherein reducing the output voltage comprises changing respective duty cycles of the first and second devices; and
        beginning the discharging of the regulated supply voltage node in response to the output voltage reaching the minimum specified voltage, wherein discharging further comprises the control circuit repeatedly activating and deactivating the second device to cause a discharge of the regulated supply voltage node via the switching node and further comprises the control circuit causing the first device to remain inactive during the repeatedly activating and deactivating the second device.

11. The method of claim 10, wherein the discharging comprises:
activating the second device for a first specified duration;
deactivating the second device for a second specified duration; and
repeating the activating and deactivating until a voltage on the regulated supply voltage node has fallen to the voltage less than or equal to the target voltage level.

12. The method of claim 11, further comprising repeating the activating and deactivating for a third duration.

13. The method of claim 10, wherein the discharging comprises:
activating the second device;
deactivating the second device in response to a current through the switching node exceeding a current threshold value, wherein deactivating comprises holding the second device inactive for a fixed duration; and
repeating the activating and deactivating until a voltage on the regulated supply voltage node has fallen to the voltage less than or equal to the target voltage level.

14. The method of claim 10, further comprising controlling a rate of discharge of the regulated supply voltage node by activating selected ones of a plurality of devices coupled between the switching node and a ground node, and wherein the plurality of devices includes the second device.

15. The method of claim 10, further comprising:
sensing, using a sensing circuit, and a amount of current passing through the switching node; and
providing an indication to the control circuit in response to the amount of current passing through the switch node reaching a threshold current value.

16. An apparatus comprising:
a load circuit coupled to receive a regulated supply voltage on a regulated supply voltage node;
a power converter configured to generate the regulated supply voltage, wherein the power converter includes:
a first transistor coupled between a switching node and an input supply voltage node;
a second transistor coupled between the switching node and a ground node; and
an inductor coupled between the switching node and an output node, wherein the regulated supply voltage is provided on the output node;
a power management circuit configured to generate a command indicating that the load circuit is to be powered down; and
a control circuit configured, in response to receiving the command, cause discharging of the output node, via the switching node and the inductor, wherein, in causing discharging of the output node, the control circuit is configured to:
cause a reduction of the output voltage to the minimum specified voltage, wherein reducing the output voltage comprises changing respective duty cycles of the first and second devices;
cause, in response to the output voltage reaching the minimum specified voltage, repeatedly activating and deactivating the second transistor to discharge the regulated supply voltage node to a voltage less than or equal to target voltage; and
cause the first device to remain inactive during the repeatedly activating and deactivating the second device.

17. The apparatus of claim 16, wherein the control circuit is configured to, during the discharging of the output node:
cause activation of the second transistor for a first fixed duration;
cause deactivation the second transistor for a second fixed duration; and
repeat causing activation and deactivation of the second transistor for the first and second fixed durations, respectively.

18. The apparatus of claim 17, wherein the control circuit is configured to repeat causing activation and deactivation of the second transistor for the first and second fixed durations, respectively, for an amount of time sufficient to discharge the output node to a voltage that is less than or equal to a target voltage.

19. The apparatus of claim 16, wherein the control circuit is configured to, in the discharging of the output node:
cause activation of the second transistor;
cause deactivation the second transistor for a fixed duration in response to a current through the switching node reaching a threshold value; and
repeat causing activation and deactivation of the second transistor until a voltage on the output node is equal to or less than a target voltage.

20. The apparatus of claim 16, further comprising a current sensing circuit configured to sense an amount of current passing through the switching node.

* * * * *